United States Patent
Fuhst et al.

(10) Patent No.: US 10,302,223 B2
(45) Date of Patent: May 28, 2019

(54) ANTI-CHATTERING VALVE CONE AND METHODS FOR USING SAME

(71) Applicant: BAKER HUGHES INCORPORATED, Houston, TX (US)

(72) Inventors: Karsten Fuhst, Giesen (DE); Donald J. Cannella, Jr., Porter, TX (US); Mario Simanowski, Meinersen (DE)

(73) Assignee: Baker Hughes, a GE company, LLC, Houston, TX (US)

( * ) Notice: Subject to any disclaimer, the term of this patent is extended or adjusted under 35 U.S.C. 154(b) by 159 days.

(21) Appl. No.: 14/976,690

(22) Filed: Dec. 21, 2015

(65) Prior Publication Data
US 2017/0175929 A1    Jun. 22, 2017

(51) Int. Cl.
F16K 47/02 (2006.01)
E21B 21/10 (2006.01)
E21B 34/06 (2006.01)
F16K 1/36 (2006.01)
F16K 1/42 (2006.01)

(52) U.S. Cl.
CPC .......... *F16K 47/023* (2013.01); *E21B 21/103* (2013.01); *E21B 34/06* (2013.01); *F16K 1/36* (2013.01); *F16K 1/42* (2013.01)

(58) Field of Classification Search
CPC . F16K 47/023; F16K 1/36; F16K 1/42; E21B 21/103

USPC ......................................................... 137/540
See application file for complete search history.

(56) References Cited

U.S. PATENT DOCUMENTS

| | | | |
|---|---|---|---|
| 2,670,922 A | * | 3/1954 | Carlisle ................ F16K 15/026 137/540 |
| 2,730,125 A | | 1/1956 | Thatcher et al. |
| 3,145,732 A | | 8/1964 | Joles |
| 5,251,664 A | | 10/1993 | Arvidsson et al. |
| 6,325,467 B1 | | 12/2001 | Seitz et al. |
| 6,328,276 B1 | | 12/2001 | Falch et al. |
| 6,951,330 B2 | | 10/2005 | Hess et al. |
| 6,983,762 B2 | | 1/2006 | Wheeler et al. |
| 7,258,135 B2 | | 8/2007 | Haarer et al. |
| 7,543,795 B2 | | 6/2009 | Hess et al. |
| 2005/0022879 A1 | | 2/2005 | Hess et al. |
| 2011/0266472 A1 | | 11/2011 | Russell |
| 2013/0192697 A1 | | 8/2013 | Kajita et al. |
| 2015/0000762 A1 | | 1/2015 | Kiffer et al. |

FOREIGN PATENT DOCUMENTS

DE         2402774 A1     7/1975

* cited by examiner

*Primary Examiner* — P. Macade Nichols
(74) *Attorney, Agent, or Firm* — Mossman, Kumar & Tyler, PC

(57) ABSTRACT

An apparatus for controlling flow of a fluid in a fluid conduit may include a closure member having an outer circumferential surface defined by a composite geometry, a biasing member applying a biasing force to the closure member, and a sealing member receiving the closure member. A fluid seal is formed in the fluid conduit when the biasing member presses the closure member against the sealing member.

15 Claims, 5 Drawing Sheets

US 10,302,223 B2

ANTI-CHATTERING VALVE CONE AND METHODS FOR USING SAME

CROSS REFERENCE TO RELATED APPLICATIONS

None.

BACKGROUND OF THE DISCLOSURE

1. Field of the Disclosure

This disclosure relates generally to flow control devices.

2. Background of the Art

Fluid pathways and conduits employ a variety of devices in order to control fluid flow. One illustrative device is a valve that is used to block fluid flow across a fluid path way upon occurrence of a specified condition. These valves may sometimes be referred to as flow stop valves. In some configurations, a flow stop valve may be set to remain open to allow fluid flow during normal operation, but close when operation is interrupted. Such interruptions of fluid flow may cause transient conditions, e.g., pressure waves, which may damage the flow stop valve or may hinder the closing of the flow stop valve. Conventional flow stop valves use dampening arrangements to reduce cyclical impact between the valve cone and seat (or "chattering") during such transient conditions.

The present disclosure provides a different approach to protecting valve components under such conditions.

SUMMARY OF THE DISCLOSURE

In aspects, the present disclosure provides an apparatus for controlling flow of a fluid in a fluid conduit. The apparatus may include a closure member having an outer circumferential surface defined by a composite geometry; a biasing member applying a biasing force to the closure member; and a sealing member receiving the closure member, a fluid seal being formed in the fluid conduit when the biasing member presses the closure member against the sealing member.

In aspects, the present disclosure also provides an apparatus for controlling flow of a fluid in a fluid conduit that includes a valve body having a base joining a nose at a juncture, wherein the base has a linear outer circumferential surface and the nose has a curved outer circumferential surface extending from the juncture; a biasing member applying a biasing force to the closure member; and a sealing member receiving the closure member, a fluid seal being formed in the fluid conduit at along a physical line of contact when the biasing member presses the closure member against the sealing member.

In aspects, the present disclosure further provides a method for controlling flow of a fluid from a first section to a second section in a conduit. The method may include enclosing the first section and the second section in an enclosure; forming a flow path conveying the fluid from the first section to the second section; positioning a sealing member, a biasing member, and a closure member in the second section and along a flow path of the flowing fluid; forming a fluid seal in the fluid conduit when the biasing member presses the closure member against the sealing member, wherein the fluid seal blocks fluid flowing along the flow path from the first section to the second section; and applying a compressive force on the sealing member using a biasing member. The closure member may have an outer circumferential surface defined by a composite geometry.

Examples of certain features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

In aspects, the present disclosure provides a flow control device for use in oil and gas well applications. One illustrative use of the flow control device is to stop the flow of a fluid, e.g., a drilling fluid, when a fluid mover (e.g., surface pumps) is stopped or deactivated. This may be a desirable function in dual gradient drilling (DGD) applications because such a flow control device can minimize a "u-tube" effect caused by equalizing the mud pressure between the inside of the drilling tubular and the return line. It may also be useful for keeping the drilling tubular filled with drilling fluid during connections in applications known as dynamic kill drilling (DKD) or riserless mud recovery (RMR). Illustrative embodiments of the present disclosure reduce the dynamic pressure loss across the flow control device by controlling the rate at which fluid passes between a valve cone and valve seat. Controlling this flow rate can delay pressure equalization across the flow control device and thereby prevent minimize valve cone chatter.

Figure 1A:
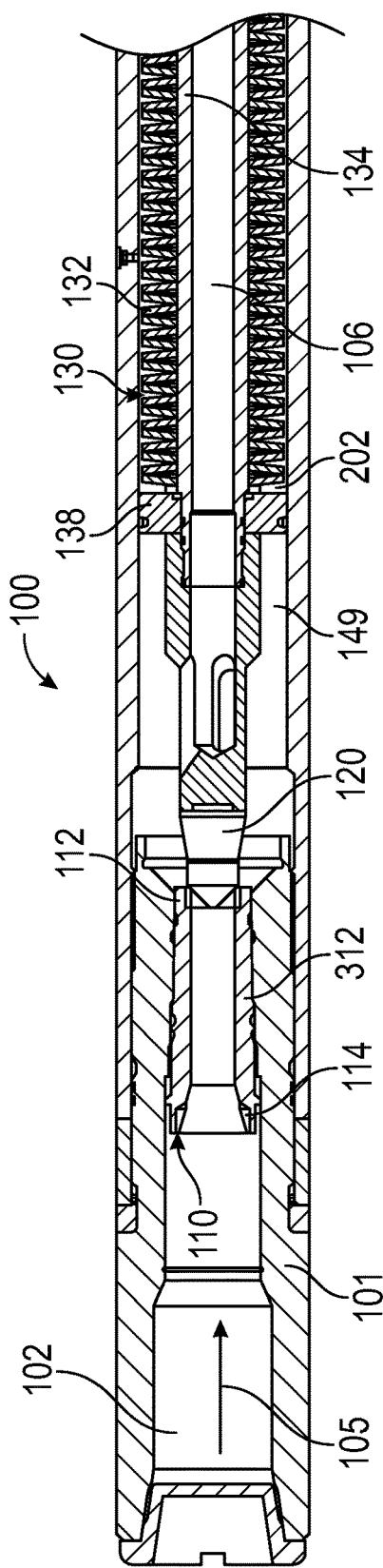
FIGS. 1A-B sectionally illustrate a flow control device made in accordance with one embodiment of the present disclosure.
Figure 1B:
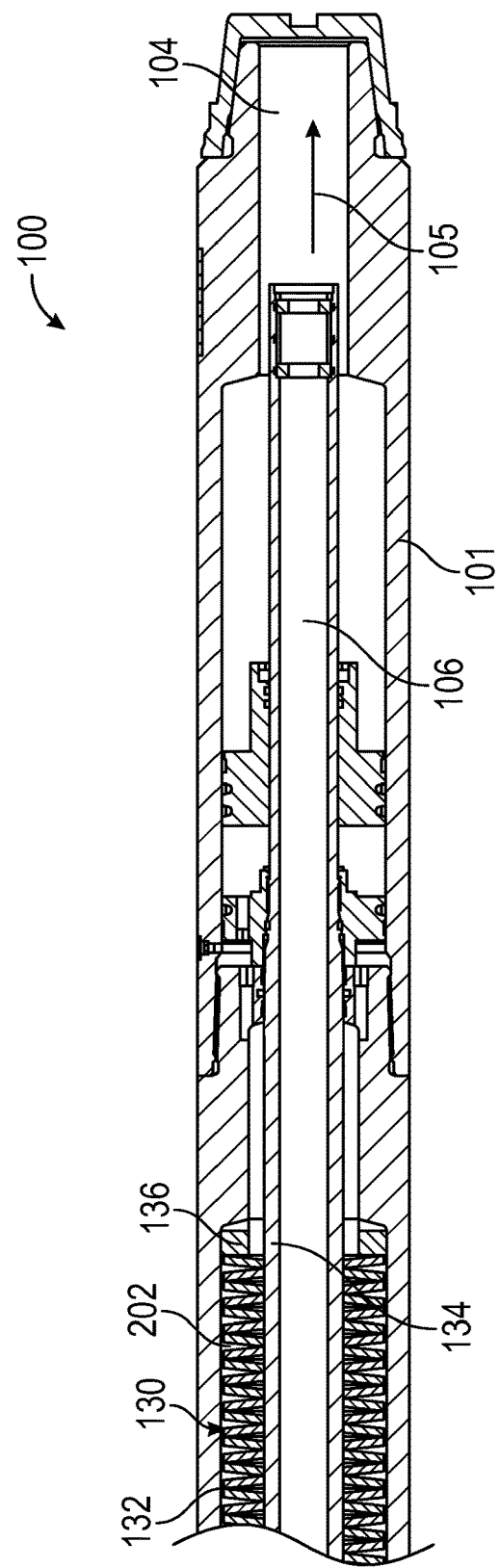

Referring to FIG. 1A-B, there is shown one embodiment of a flow control device 100 for controlling fluid flow along a conduit having an upper section 102 (FIG. 1A) and a lower section 104 (FIG. 1B). The flow control device may include an enclosure 101 that connects with the upper section 102 (FIG. 1A) and the lower section 104 (FIG. 1B); e.g., a threaded connection. In one arrangement, a fluid 105 flows from the upper section 102 to the lower section 104. The flow control device 100 may be configured to block this fluid flow upon the occurrence of one or more conditions. As used herein, the term "flow control device" may be a valve, choke, flow restrictor or other such device that can partially or completely block fluid flow along a path way. As used herein, the term fluid refers to liquids and mixtures that are mostly liquid (i.e., more than fifty percent liquid).

The flow control device 100 may include a flow path 106 providing fluid communication between the upper section 102 and the lower section 104, a sealing member 110, a closure member 120, and a biasing member 130. In one embodiment, the biasing member 130 may include spring members 132 (e.g., disk springs, leaf springs, coil springs, etc.) that surround and are supported on a mandrel 134. The springs members 132 may be disposed between a retaining wall 136 and a piston 138 that is connected to the mandrel 134. Optionally, the flow control device 100 may include a dampener 140 that is operatively connected to and controls the movement of the closure member 120 during seating with or unseating from the sealing member 110.

Figure 2:
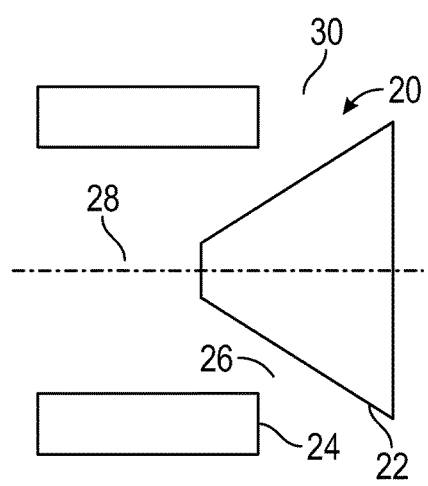
FIG. 2 schematically illustrates a prior art valve cone.

The advantages of the present teachings may be illustrated by first describing a conventional closure member 20, such as that shown in FIG. 2. The conventional closure member 20 may be a cone having an outer surface 22 defined by a straight line; i.e., a linear surface. Initially, an area 28 upstream of the closure member 20 has a pressure higher than a pressure at an area 30 downstream of the closure member 20. When this differential pressure reaches a threshold value, the spring force of a biasing member (e.g., biasing member 130 of FIG. 1A) is overcome and the closure member 20 unseats by moving axially away from a valve seat 24.

When the conventional closure member 20 separates from the valve seat 24, an annular flow area 26 between the conventional closure member 20 and the valve seat 24 increases in size. This size increase allows a corresponding increase in fluid flow from the upstream area 28 to the downstream area 30. This fluid flow can be sufficiently high enough to allow pressure equalization between the upstream area 28 and downstream area 30, which then can cause the conventional closure member 20 to reseat due to the spring force.

Closure members, or valve cones, according to the present disclosure may be sized and shaped to control the rate at which the pressure differential across a flow control device decreases while the closure member disengages and slides away from a sealing member, such as a valve seat.

Figure 3A:
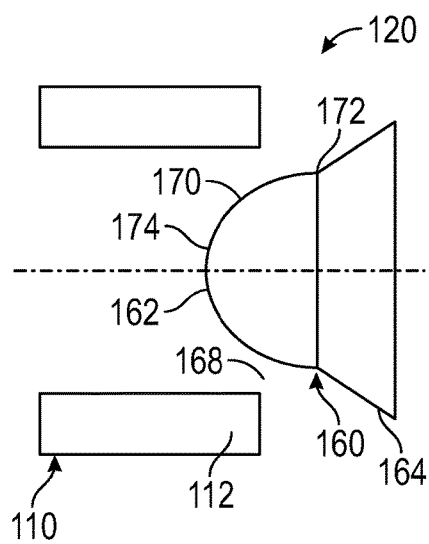
FIGS. 3A-C schematically illustrate non-limiting embodiments of valve cones made in accordance with the present disclosure.
Figure 3B:
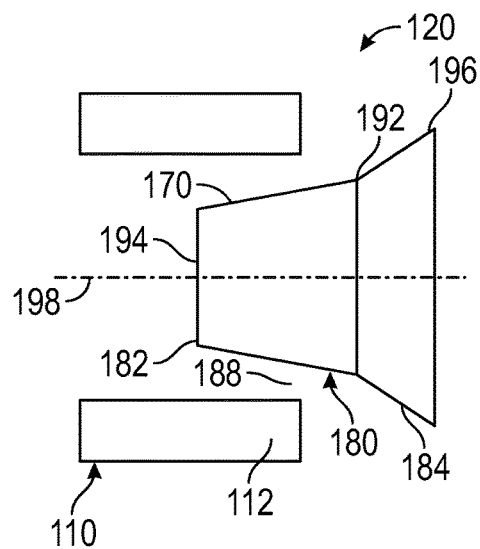
Figure 3C:
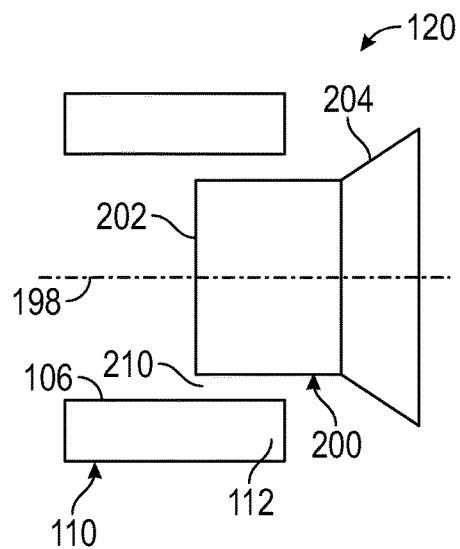

Referring to FIGS. 3A-C, closure members 120 according to the present disclosure have a cone body defined by one or more surfaces configured to reduce the rate at which an annular flow space increases, which then delays pressure equalization. In these embodiments, the closure member 120 seats against the sealing member 110, which may be formed as a sleeve or ring-like member that has a valve seat 112. A fluid-tight seal, which may be a metal-to-metal seal, may be formed between the closure member 120 and the sealing member 110.

FIG. 3A shows a closure member 120 having a body with an outer surface 160 defined by a composite geometry that includes linear and curved surfaces. The outer surface 160 extends around a circumference of the closure member 120. The closure member has a nose 162 and a base 164. The base 164 may have a linear surface aligned to seat against the valve seat 112.

The nose 162 may be formed using a geometry that allows the annular flow space 168 to increase in size slowly relative to the FIG. 2 closure member 20. In one non-limiting embodiment, an outer surface 170 of the nose 162 follows a curve having a first end point at a juncture 172 with the base 164 and a second end point at or proximate to an apex 174 of the nose 162. The outer surface 170 may be described as concave dome that projects from a straight line (not shown) that connects the juncture 172 and the apex 174. In some embodiments, the outer surface 170 may be defined by a mathematical formula. It should be noted that the projecting curved surface 170 creates a smaller cross-sectional flow area with the adjacent valve seat 112 between the juncture 172 and the apex 174 as compared to the FIG. 2 closure member 20. That is, the surface 22 of the prior art valve cone 20 would not project from such a straight line.

It should be noted that the composite geometry is used principally along the surfaces of the closure member 120 that defines the annular flow area. Thus, the surfaces defining this annular flow area are circumferential. Axially, this area is generally bounded at one end by a line of physical contact between the closure member 120 and the valve seat 112 and at the other end by the apex 174.

FIG. 3B shows another closure member 120 having a body with an outer surface 180 defined by a composite geometry having two straight lines with different slopes. The closure member has a nose 182 and a base 184. The base 184 may be configured as the base 164 of FIG. 3A.

The nose 182 also uses a geometry that allows the annular flow space 188 to increase in size slowly relative to the FIG. 2 closure member 20. In one non-limiting embodiment, an outer surface 189 of the nose 182 follows a straight line having a first end point at a juncture 192 with the base 184 and a second end point at or proximate to a face 194 of the nose 182. The slope of the line defining the outer surface 189 is less than the slope of the line defining the outer surface of the base 184. The slopes are with reference to a longitudinal axis 198. It should be noted that, due to the relatively shallower slope, the outer surface 189 creates a smaller cross-sectional flow area between the juncture 192 and the face 194 as compared to the FIG. 2 closure member 20.

FIG. 3C shows still another closure member 120 having a body with an outer surface 200 defined by a composite geometry having one sloped line and one line parallel with the longitudinal axis 198. The closure member has a nose 202 and a base 204. The base 204 may be configured as the base 164 of FIG. 3A.

The nose 202 uses a geometry that varies the distance the fluid travels in an annular flow path in order to delay the loss of a pressure differential across the flow control device 100. In one non-limiting embodiment, the nose 202 is formed as a cylinder that is separated from an inner surface 106 of the valve seat 208 by an annular flow space 210. In this arrangement, axial displacement of the closure member 120 away from the valve seat 112 reduces the axial distance the fluid travels through the annular flow space 210. Thus, while the size of the annular flow space does not substantially vary, flow resistance decreases as the distance the fluid travels decreases.

Figure 4:
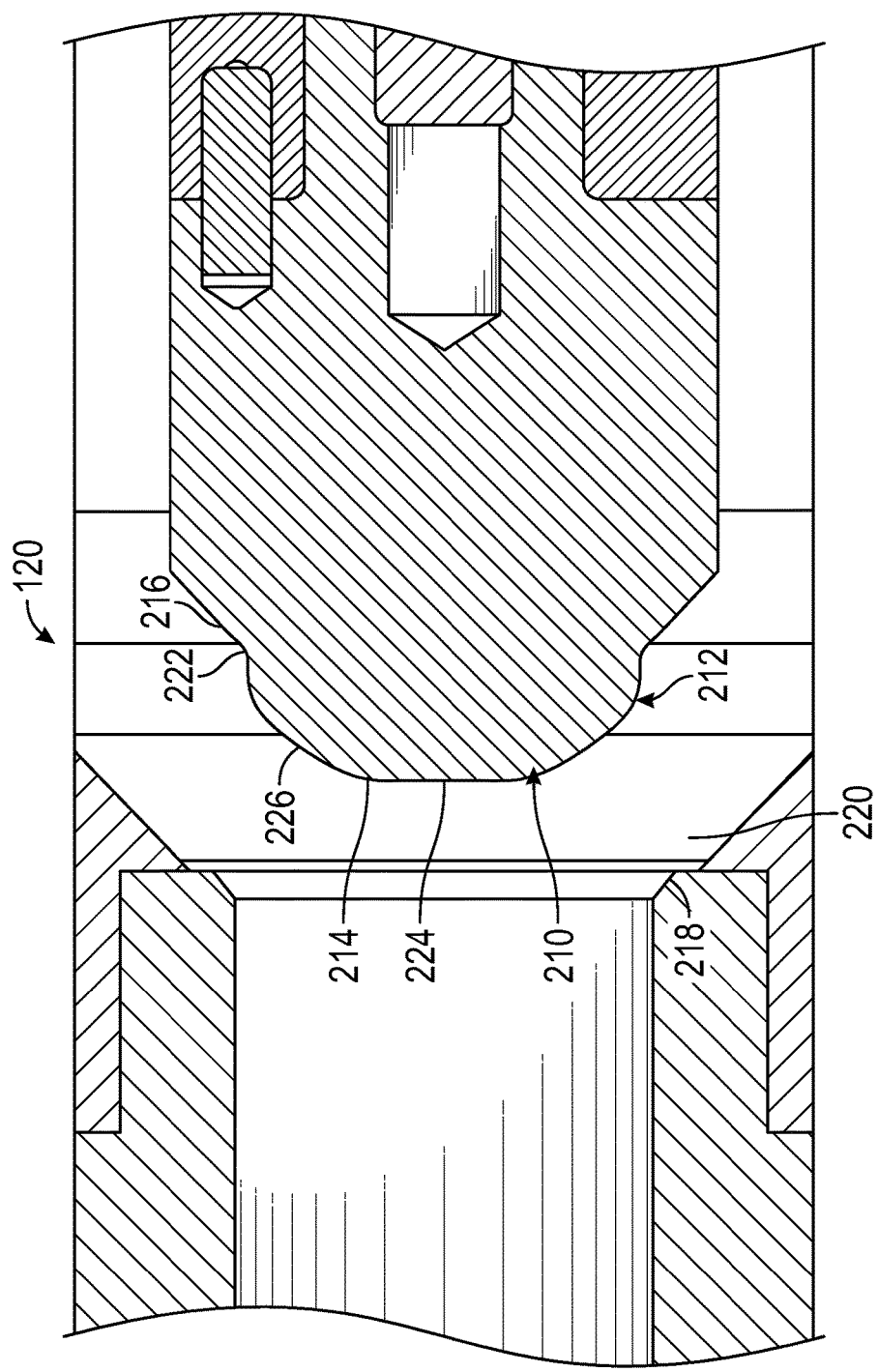
FIG. 4 schematically illustrates another non-limiting embodiment of a valve cone in accordance with the present disclosure.

Referring now to FIG. 4, there is shown another non-limiting embodiment of a closure member 120 that may be used in conjunction with a flow control device 100. The FIG. 4 closure member 120 has a body 210 with an outer surface 212 defined by a composite geometry. The outer surface 212 extends along the circumference of the body 210. The closure member has a nose 214 and a base 216. The base 216 may have a linear surface aligned to seat along a contact line with an edge of a valve seat 218. In one aspect, the linear surface is circumferential to provide a contiguous line of contact. A fluid-tight seal, which may be a metal-to-metal seal, occurs along such a contact line.

The nose 214 may be formed using a geometry that allows the annular flow space 220 to increase in size slowly relative to the FIG. 2 closure member 20. In one non-limiting embodiment, the nose 214 has a juncture 222 with the base 216, an end face 224, and a concave outer surface 226 that connects the base 216 to the end face 224. It should be noted that by extending from the juncture 222 and terminating at the end face 224, the concave outer surface 226 from the majority, i.e., more than fifty percent, of the surface on the closure member 120 that defines an annular flow path 220. The concave outer surface 226 may follow a curve that forms a dome-like projection on the nose 214. Thus, in one aspect, the outer surface 226 is circumferential.

The geometry of the curve defining the concave outer surface 224 may depend on a number of factors including, but not limited to, the dimensions of the components of the flow control device 100, the expected operating parameters, and properties of the flowing fluid. Generally speaking, the geometry may be selected to gradually increase an annular flow area 220 between the closure member 120 and the valve seat 218. For some embodiments, the x, y coordinates of a curve defining the outer surface 224 may be defined by the formula: $y = m\ x^n$.

The variable "m" may be a value between 0.0001 and 0.0200, a value between 0.0010 and 0.014, or a value between 0.0010 and 0.012. The value "n" may be a value between 1.1 and 5, a value between 2 and 4, or a value between 2.5 and 3.5. It is emphasized that the present disclosure is not limited to any particular formula or method for establishing the geometry of the outer surface 226.

Referring to FIGS. 1A-B, in one mode of operation, the fluid flow parameter (e.g., flow rate, pressure, etc.) of the fluid supplied to the upper section 102 reaches a value sufficient to generate a pressure against the closure member 120 that overcomes the biasing force of the biasing member 130. This may sometimes be referred to as the "crack open" pressure of the flow control device 100. Thus, the closure member 120 unseats and the fluid fills a cavity 149 next to the piston 138. The fluid pressure in the cavity 149 displaces the piston 138 and compresses the spring members 132. The movement of the piston 138 also activates the dampener 140, if present, which also resists the unseating movement.

Referring to FIG. 4, advantageously, the shape of the closure device 120, and particularly the concave outer surface 224 controls the size of the annular flow space 220 such that the pressure differential across the flow control device 100 is high enough to prevent the closure member 120 from reversing the direction of axial movement and re-seating on the valve seat 218.

It should be appreciated that the teachings of the present disclosure may be used in any number of situations wherein it is desired to form a fluid tight seal along a flow path in a controlled manner. Some of these situations involve an arrangement wherein the fluid flow is used to maintain a flow control device in an open position and the interruption of fluid flow is used to initiate the closing of the fluid flow device. Described below is one non-limiting mode of operation.

Figure 5:
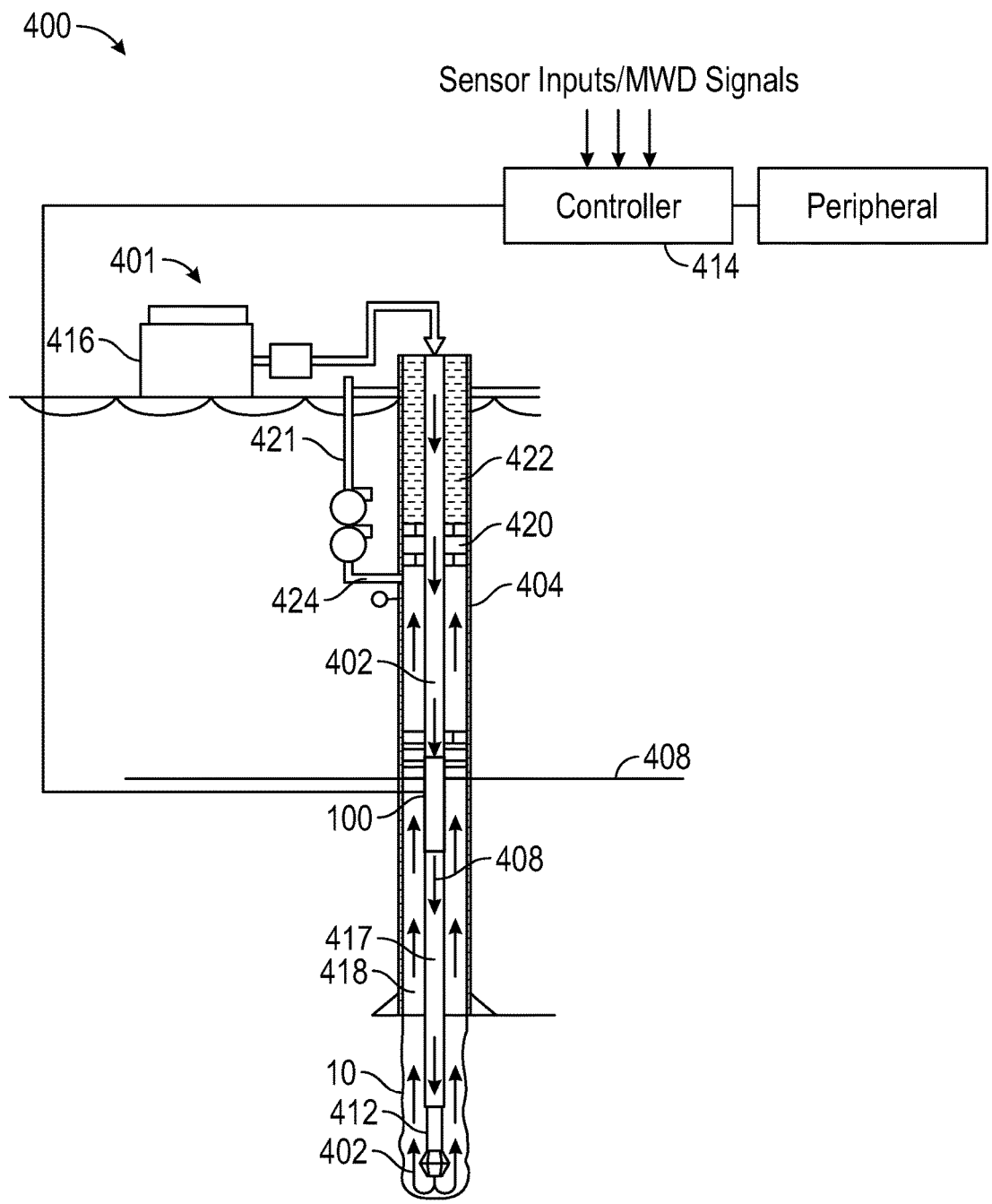
FIG. 5 schematically illustrates a dual gradient drilling system, which may employ flow control devices in accordance with the present disclosure.

Referring now to FIG. 5, there is a system 400 that may use a flow control device 100 for controlling flow during dual gradient drilling. In dual gradient applications, mud pumps on the sea floor may be used to supercharge the drilling fluid so that it returns against a higher geostatic pressure through the annulus/return lines to the surface (drilling platform or ship). This reduces the pressure gradient inside the well annulus, allowing very tight windows between formation fracture pressure and formation pore pressure to be used.

FIG. 3 schematically shows a surface platform 401 from which a drill string 402 may be deployed to drill a wellbore 10. The drill string 402 may be disposed in a conduit formed of a riser 404 that extends from the platform 401 to the seabed 408. The drill string 402 may include a tubular member 408 that carries a bottomhole assembly (BHA) 412 at a distal end. The tubular member, which may be jointed tubulars or coiled tubing, is configured for use in the wellbore 10 (a wellbore tubular) and may include power and/or data conductors such as wires for providing bidirectional communication and power transmission (e.g., wired pipe). The conductors may be optical, metal, etc. Communication signals may also be transmitted by pressure pulses, acoustic signals, EM waves, RF waves, etc. A top drive (not shown), or other suitable rotary power source, may be utilized to rotate the drill string 402. A controller 414 may be placed at the surface for receiving and processing downhole data. The controller 414 may include a processor, a storage device for storing data and computer programs. The processor accesses the data and programs from the storage device and executes the instructions contained in the programs to control the drilling operations.

The system 400 may include a fluid circulation system 416 that flows a drilling fluid into a bore 417 of the drill string 402. The fluid exits and returns to the riser 406 via an annulus 418. The riser 406 may include a restriction device 420 that diverts the fluid flowing in the annulus 418 to a flow cross line or a diverter line 421. A subsea pump 424 pumps the return fluid from the riser 406 to the surface via the diverter line 421. FIG. 3 further illustrates a material 422 having a lower density than the fluid in the annulus 418 in the riser 406 uphole of restriction device 420. The material 422 usually is seawater. However, a suitable fluid could have a density less or greater than seawater. The material 422 is used in providing a static pressure gradient to the wellbore that is less than the pressure gradient formed by the fluid downhole of the flow restriction device 420.

During drilling, fluid circulation system 416 maintains a continuous flow of fluid for the system 400. However, deactivating the fluid circulation system 416 does not immediately stop fluid circulation in the well because the density of the fluid in the bore 417 is greater than the density of the fluid in the annulus 418. That is, fluid in the bore 417 will continue to flow downward and out to the annulus 418 until the hydrostatic pressure in the bore 417 and the annulus 418 are the same. This is sometimes referred to as a "u-tube" effect.

To maintain better control over fluid circulation in the system 400, a flow control device 100 may be positioned along the drill string 402. For example, the enclosure 101 (FIG. 1A,B) may be configured to interconnect with the drill string 402. The operating set points of the fluid circulation system 416 (e.g., flow rate/pressure) may be selected to maintain the flow control device 100 in an open position during normal operation. In the event that fluid circulation is interrupted, the flow control device 100 shifts to the closed position in a manner previously described, which blocks flow down the bore 417 by forming a fluid seal. Even though the hydrostatic pressure in the bore 417 may be greater than the hydrostatic pressure in the annulus 418, the closed fluid control device 100 prevents downward fluid flow.

It should be understood that dual gradient drilling is merely one non-limiting use of flow control devices of the present disclosure. While the foregoing disclosure is directed to the one mode embodiments of the disclosure, various modifications will be apparent to those skilled in the art. It is intended that all variations within the scope of the appended claims be embraced by the foregoing disclosure.

We claim:

1. An apparatus for controlling flow of a fluid in a fluid conduit, comprising:
   a closure member having an outer circumferential surface defined by a composite geometry;

a biasing member applying a biasing force to the closure member; and a sealing member receiving the closure member, a fluid seal being formed in the fluid conduit when the biasing member presses the closure member against the sealing member, the outer circumferential surface defining an annular flow path between the sealing member and the closure member, wherein the composite geometry increases an annular flow area between the closure member and the sealing member to reduce the rate at which the annular flow area increases.

2. The apparatus of claim 1, wherein the closure member has a nose and a base, wherein the nose has an outer circumferential surface defined by a geometry different from a geometry defining an outer circumferential surface of the base.

3. The apparatus of claim 2, wherein the outer surface of the nose is at least partially defined by a curve and the outer surface of the base is defined at least partially by a straight line.

4. The apparatus of claim 1, wherein the composite geometry includes at least a curve and a straight line.

5. The apparatus of claim 4, wherein the curve has a juncture with the straight line at a first end and terminates at a face of the nose at a second end.

6. The apparatus of claim 1, wherein a physical line of contact is formed between the base and the sealing member when the closure member is pressed against the sealing member and wherein the composite geometry is formed within an area bounded at one end by the line of physical contact and at the other end by an apex of the closure member.

7. An apparatus for controlling flow of a fluid in a fluid conduit, comprising:
  a valve body having a base joining a nose at a juncture, wherein the base has a linear outer circumferential surface and the nose has a curved outer circumferential surface extending from the juncture;
  a biasing member applying a biasing force to the closure member; and
  a sealing member receiving the closure member, a fluid seal being formed in the fluid conduit at along a physical line of contact when the biasing member presses the closure member against the sealing member, the line of contact being along the linear outer circumferential surface, wherein the composite geometry increases an annular flow area between the closure member and the sealing member to reduce the rate at which the annular flow area increases.

8. The apparatus of claim 7, wherein the valve body further includes an end face and wherein the curved outer circumferential surface terminates at the end face.

9. The apparatus of claim 8, wherein the curved outer circumferential surface is concave and projects from the nose.

10. The apparatus of claim 9, wherein the curved outer circumferential surface follows a curve defined by $y=mx^n$, wherein m is between 0.0001 and 0.0200 and n is a value between 1.1 and 5.

11. The apparatus of claim 9, wherein the curved outer circumferential surface forms a majority of the surface on the closure member that defines an annular flow path between the closure member and the sealing member.

12. A method for controlling flow of a fluid from a first section to a second section in a conduit, comprising:
  enclosing the first section and the second section in an enclosure;
  forming a flow path conveying the fluid from the first section to the second section;
  positioning a sealing member, a biasing member, and a closure member in the second section and along a flow path of the flowing fluid;
  forming a fluid seal in the fluid conduit when the biasing member presses the closure member against the sealing member, wherein the fluid seal blocks fluid flowing along the flow path from the first section to the second section; and
  applying a compressive force on the sealing member using a biasing member,
  wherein the closure member has an outer circumferential surface defined by a composite geometry, the outer circumferential surface defining an annular flow path, wherein the composite geometry increases an annular flow area between the closure member and the sealing member to reduce the rate at which the annular flow area increases.

13. The method of claim 12, wherein the closure member has a nose and a base, wherein the nose has an outer circumferential surface defined by a geometry different from a geometry defining an outer circumferential surface of the base.

14. The method of claim 13, wherein the outer surface of the nose is at least partially defined by a curve and the outer surface of the base is defined at least partially by a straight line.

15. The method of claim 14, wherein the closure member body further includes an end face and wherein the curve terminates at the end face.

* * * * *